United States Patent

Hirai et al.

Patent Number: 5,362,280
Date of Patent: Nov. 8, 1994

[54] POWER TRANSMISSION SYSTEM

[75] Inventors: Hideo Hirai, Hyogo; Kyoichi Mishima, Higashimachi; Susumu Yamakawa, Kobe, all of Japan

[73] Assignee: Mitsuboshi Belting Ltd., Kobe, Japan

[21] Appl. No.: 986,243

[22] Filed: Dec. 7, 1992

[51] Int. Cl.⁵ ............................................. F16H 7/02
[52] U.S. Cl. ...................................... 474/135; 474/101
[58] Field of Search ................. 474/101, 133, 134, 135

[56] References Cited

U.S. PATENT DOCUMENTS

| | | | |
|---|---|---|---|
| 4,285,676 | 8/1981 | Kraft | 474/135 |
| 4,309,174 | 1/1982 | Sproul | 474/135 |
| 4,713,044 | 12/1987 | Nakamura et al. | 474/135 |
| 5,098,347 | 3/1992 | Sajazuk et al. | 474/135 |

*Primary Examiner*—Douglas D. Watts
*Attorney, Agent, or Firm*—Wood, Phillips, VanSanten, Hoffman & Ertel

[57] ABSTRACT

A power transmission system having: a power transmission belt with a tensile strength such that a force of at least 17 kgf per 1 mm width is required to effect a 1% elongation of the belt; a plurality of pulleys with which the power transmission belt is operatively engaged; and an auto-tensioner having an element to engage the power transmission belt. The auto-tensioner has a damping ratio that is not greater than 20%, where the damping ratio is defined by the following formula: Damping ratio=$2[(A-B)/(A+B)] \times 100$, where A is the force exerted by the auto-tensioner element during up-stroking of the auto-tensioner element and B is the force exerted by the auto-tensioner element during down-stroking of the idler pulley. More preferably, the damping ratio is 10–20%.

22 Claims, 3 Drawing Sheets

POWER TRANSMISSION SYSTEM

BACKGROUND OF THE INVENTION

1. Field of the Invention

This invention relates to power transmission systems and, more particularly, to a system which employs a V-ribbed belt to drive and/or be driven by a plurality, and preferably at least three, pulleys. The inventive system exhibits excellent drive characteristics with minimal noise generation.

2. Background Art

Power transmission systems utilizing V-ribbed belts are desirable because of their ability to positively and efficiently transmit a large force in a compact space. Because of these characteristics, the V-ribbed power transmission system has a wide range of applications. One exemplary application for such systems is in the automotive industry. A single belt has been used to replace a plurality of belts which are used to simultaneously drive various engine accessories off the engine crankshaft.

In the prior art multi-belt power transmission system, a plurality of belts are trained, one each around a pulley on the engine crankshaft and a shaft carried by each accessory to be driven during engine operation. To accommodate the numerous accessories, this type of system requires that the engine crankshaft be extended sufficiently in an axial direction to accommodate the same number of pulleys as there are accessories to be driven. As a result, the engine crankshaft becomes quite lengthy. In turn, the engine compartment must be made sufficiently large to accommodate this extended crankshaft.

The recent trend has been to move away from the above conventional system to the single belt system. In this system, commonly referred to as a serpentine drive system, a single belt, as disclosed for example in U.S. Pat. No. 4,028,955 and Japanese Patent Laid-Open No. 50-49563, is employed. The belt wraps around all of the accessories that are to be driven by the crankshaft. The single belt system simplifies the engine construction by requiring only a single pulley on the crankshaft. The crankshaft extension required to accommodate the pulley is minimal. The engine may resultingly be made relatively compact, and the compartment size required to accommodate the engine can be reduced over the earlier described conventional construction.

In the most basic serpentine belt system, a V-ribbed belt is wrapped around various pulleys which are in a fixed position. The components are adjusted at assembly to place the desired tension on the belt. However, because the belt is very long and relatively thin, it has a tendency to elongate during use. The result of this is that the tension applied to the belt is reduced, which may result in slippage and, in a worse case, disengagement of the belt from the pulleys.

To avoid this belt slackening, it is known to use an auto-tensioner with an idler pulley thereon that is biased, as by a spring, against an unsupported portion of the belt between adjacent pulleys with a predetermined tension. The auto-tensioner compensates for elongation of the belt.

There is an additional problem that is associated with the V-ribbed belt, that is not contended with with conventional V-belts. The long V-ribbed belt, operating on an automobile engine, is subjected to a large load variation as the engine starts, stops and is accelerated. This load variation tends to induce vibrations to the system which may result in rough operation and/or unwanted noise generation.

To diminish the effects of vibration, auto-tensioners have been constructed with assemblies to damp these vibrations, in addition to applying a predetermined tension to the belt. Various damping structures have been employed. In one exemplary system, a sliding member is translated against typically a disk-shaped friction generating surface by a spring element, that is separate from a torsion spring of the type normally used to pivot the support arm carrying the idler pulley in a direction to tension a belt. This generates a constant friction force on the belt during use. This type of system is disclosed in Japanese Patent Application No. 63-258870. The teaching therein is that the auto-tensioner should have a damping ratio of not less than 30%, with the damping ratio being expressed by the following formula: $2\times[(A-B)/(A+B)]\times 100$, where A and B respectively indicate forces exerted during up-stroking and down-stroking of the idler pulley.

Heretofore, the serpentine systems utilizing a V-ribbed belt, in combination with an auto-tensioner, have been able to stably transmit power without the belt disengaging from the pulleys. However, with these systems, there has been an undesirably high level of noise generation during acceleration and deceleration, and particularly at startup of the engine.

It is a common understanding among those skilled in the power transmission system art that noise from transmission belts occurs particularly when the tension of the belt has decreased. In those power transmission systems which do not employ an auto-tensioner, it has been the practice to increase the tension on the V-ribbed belt to suppress the generation of noise. However, it has been demonstrated that a power transmission system employing an auto-tensioner generates an undesirably large amount of noise when the engine speed is varied, as during startup of the engine, even when the belt tension is kept constant through the auto-tensioner.

SUMMARY OF THE INVENTION

The inventors herein have undertaken an intense study to determine why noise is generated in a power transmission system employing an auto-tensioner. It has been found that significant noise in such systems is generated when the engine is in its intake or exhaust strokes, during which the engine is being decelerated. When the engine is in the power stroke, the acceleration of the engine crankshaft increases so that the tensioned side of the V-ribbed belt is pulled with a strong force while the tension in the slackened portion of the belt is decreased. In this state, the auto-tensioner exerts a force on the belt to maintain a constant tension thereon so that the belt does not slip and noise generation is suppressed. The belt tension at the slackened portion of the belt is not reduced to zero, due to a force applied to the belt by the auto-tensioner, as seen in FIG. 4(c) herein.

After the suction stroke, the compression stroke is commenced at which time the angular acceleration of the crankshaft is reduced to a negative value so that the velocity of the belt momentarily exceeds the peripheral velocity of the pulley on the crankshaft, which results in the belt pulling the crank pulley. At this point, a drastic contraction of the belt results on the tensioned side thereof, which was elongated while the peripheral velocity of the crank pulley was high. As this occurs, the belt slips, resulting in noise generation on the tensioning side of the crank pulley. This condition can be seen in FIG. 4(b) herein which shows that the belt tension is momentarily reduced to zero at the tensioned side of the belt.

Based on this study, the inventors herein discovered that the generation of noise through slippage and/or friction is effectively suppressed using a V-ribbed belt, that elongates very little in use, in combination with an auto-tensioner. One exemplary V-ribbed belt, developed by the inventors herein, is disclosed in Japanese Patent Appln. No. 2-312513. The V-ribbed belt disclosed therein requires a force of at least 17 kgf per 1 mm of belt width to attain 1% elongation of the belt.

Heretofore, it has been the practice to use an auto-tensioner, as with the belt in Japanese Patent Application No. 2-312513, with a high damping ratio to effectively damp vibrations. To achieve this high damping ratio, a friction member and a slide member are normally required, as previously described. The result is that the auto-tensioner becomes relatively complicated. Besides increasing manufacturing costs, the durability of the auto-tensioner is diminished, which may result in failure.

In light of the above problems and shortcomings of the prior art, it is the principal objective of the present invention to provide a power transmission system which employs a V-ribbed belt, with low elongation, in combination with an auto-tensioner. The system is designed to suppress noise generation during startup of the engine, while obviating the need for a large damping ratio for the auto-tensioner.

To achieve the above objectives, one form of the invention consists of a power transmission system having: a power transmission belt with a tensile strength such that a force of at least 17 kgf per 1 mm width is required to effect a 1% elongation of the belt; a plurality of pulleys with which the power transmission belt is operatively engaged; and an auto-tensioner having an element to engage the power transmission belt. The auto-tensioner has a damping ratio that is not greater than 20%, where the damping ratio is defined by the following formula: Damping ratio=$2[(A-B)/(A+B)] \times 100$, where A is the force exerted by the auto-tensioner element during up-stroking of the auto-tensioner element and B is the force exerted by the auto-tensioner element during down-stroking of the auto-tensioner element. More preferably, the damping ratio is 10-20%.

With the belt, as described above, the amount of elongation and contraction during use are limited. Thus noise generation is effectively suppressed, as in an automotive environment, even when the angular acceleration of the engine is decreased during the suction and compression strokes.

In one form, the power transmission belt is a V-ribbed belt with a plurality of laterally spaced ribs and at least one of the pulleys has grooves to cooperate with the ribs.

The power transmission belt has an unsupported tensioned portion between a first pair of pulleys and an unsupported slackened portion between a second pair of pulleys. Preferably, the auto-tensioner element is positioned to engage the unsupported slackened portion of the power transmission belt.

Preferably, the auto-tensioner element exerts a force on the belt that is greater than or equal to 0.85 kgf per 1 mm belt width and less than or equal to 2.0 kgf per 1 mm belt width. This range of force avoids belt slippage yet does not excessively load shafts and bearings associated with the system or excessively tension the belt.

The auto-tensioner, according to the present invention, may have any suitable construction to consistently impart and maintain a predetermined tension as the belt expands and contracts in use. A suitable auto-tensioner utilizes an idler pulley to impart the tension to the belt.

With the inventive system, the auto-tensioner does not need, and preferably does not have, any structure dedicated to vibration damping. This simplifies the auto-tensioner construction and makes it less prone to failure.

Simple damping structure may be incorporated into the auto-tensioner. However, the normal frictional forces in the system are generally capable of producing the desired damping ratio range of 10-20%.

In one form, the auto-tensioner has a base for attachment to a fixed frame and an arm mounted for pivoting movement relative to the base in first and second opposite directions. In one form, a pivot post mounts the auto-tensioner arm for pivoting movement relative to the base and the damping ratio is attributable substantially entirely to friction forces generated between the pivot post and base. Thus, the auto-tensioner is required to possess only a tensioning capability.

The power transmission belt may be any one of a J-type, K-type, and L-type V-ribbed belt.

To limit elongation, the power transmission belt has a plurality of longitudinally extending load carrying cords. In one form, the cords are made at least partially from glass or aramid fiber.

In one form, the load carrying cords are spun at a pitch that is between 1.05 and 1.25 times the diameter of the load carrying cords.

The invention further contemplates a power transmission system having a V-ribbed power transmission belt with a plurality of laterally spaced ribs, and an auto-tensioner having an element to engage the power transmission belt in an operative position trained around a plurality of pulleys. The auto-tensioner has a damping ratio that preferably is not greater than 20% and more preferably in the range of 10-20%.

DETAILED DESCRIPTION OF THE DRAWINGS

Figure 1:
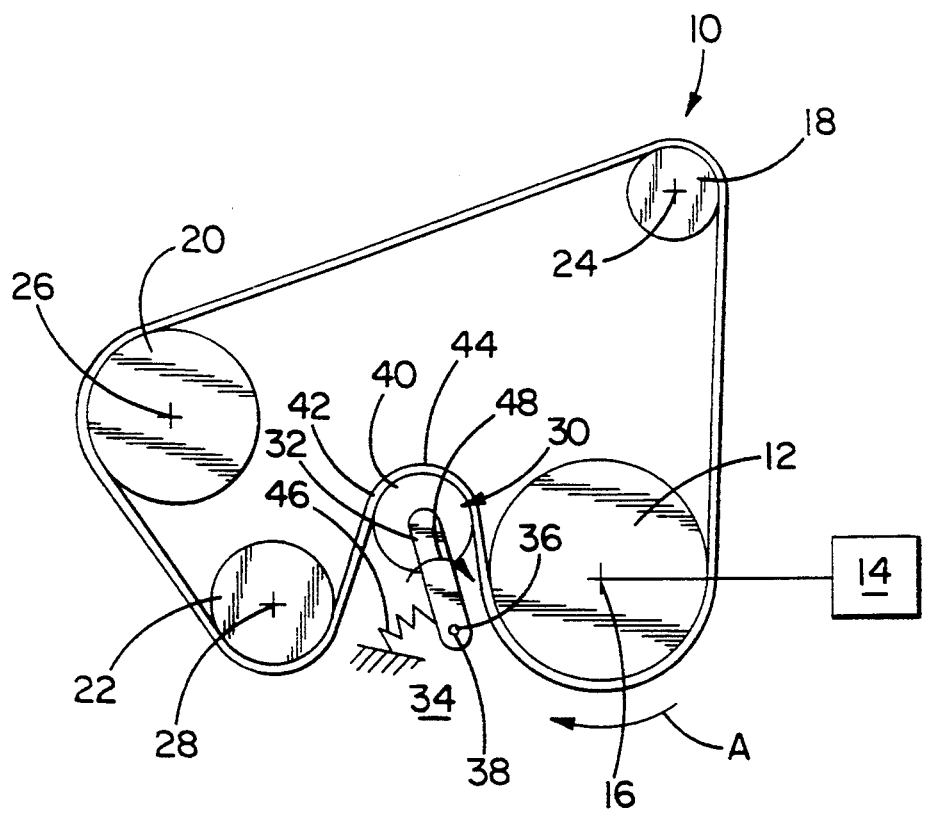
FIG. 1 is a schematic representation of a serpentine power transmission system suitable for incorporation of the present invention.
Figure 2:
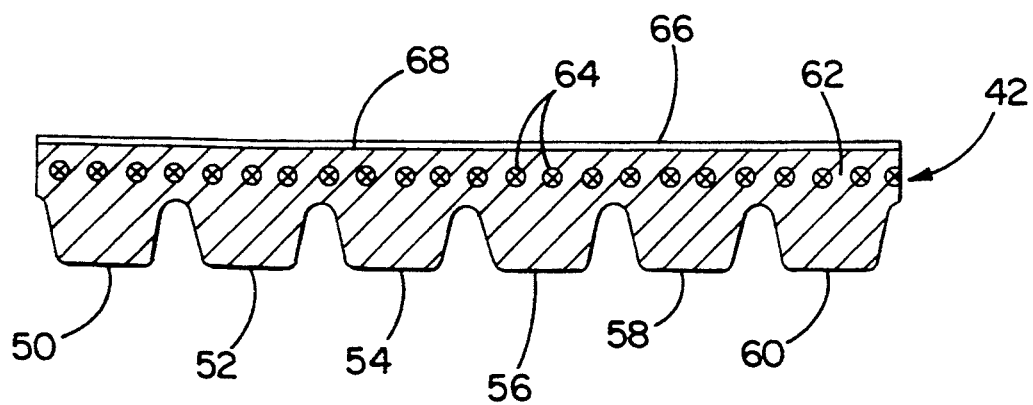
FIG. 2 is a cross-sectional view of a V-ribbed, power transmission belt on the system in FIG. 1.

One form of power transmission system, according to the present invention, is shown at 10 in FIG. 1. The system 10 is a serpentine belt system on an automobile engine and is exemplary of one type of system with which the present invention has utility. This particular system should not be viewed as limiting the invention as the inventive concepts can be utilized in other environments.

In the system 10, a pulley 12 is attached to an engine crankshaft 14 for rotation about an axis 16 in the direction of arrow A. Separate, spaced pulleys 18, 20, 22 are mounted for rotation about axes 24, 26, 28, respectively, which axes 24, 26, 28 are parallel to the axis 16. The pulley 18 is connected to the shaft of a generator, the pulley 20 is connected to the shaft of a power steering system, and the pulley 22 is connected to the shaft of a compressor for an air conditioning unit.

An auto-tensioner is provided at 30 and has an arm 32 mounted relative to a base 34 for pivoting movement about an axis 36, that is parallel to the axes 16, 24, 26, 28. A pivot post 38 establishes the pivot connection between the arm 32 and base 34. The arm 32 has an idler pulley 40 mounted at a location remote from the pivot axis 36 to bear on a belt 42 which is trained around the pulleys 12, 18, 20, 22. The idler pulley 40 is borne against an unsupported portion 44 of the belt 42 between the pulleys 12, 22. The unsupported portion 44 downstream of the pulley 12 is slackened whereas the unsupported belt portion upstream of the pulley 12 between the pulley 12, 18 is drawn by the pulley 12 and thereby tensioned. A spring 46 urges the arm 32 in a clockwise pivoting direction about the axis 36, as indicated by the arrow 48, in a tensioning direction. The spring 46 is responsible for producing the desired tension on the slackened belt portion 44 through the idler pulley 40.

The belt 42 is preferably a V-ribbed belt having a plurality of longitudinally extending, laterally spaced ribs 50, 52, 54, 56, 58, 60. While six ribs 50, 52, 54, 56, 58, 60 are shown, any number of ribs may be used according to the invention. The belt 42 has a cushion rubber layer 62 within which a plurality of longitudinally extending load carrying cords 64 are embedded. A cloth layer 66 covers the outside surface 68 of the cushion rubber layer 62.

According to the invention, the belt 42 is constructed so that a force of at least 17 kgf is required per 1 mm belt width to effect a 1% elongation of the belt 42. The elongation properties of the belt 42 are determined to a great extent by the load carrying cords 64. Similarly, the elongation of the belt, for a given level of tension, is determined by the lateral dimension of the belt 42, regardless of the size of the ribs 50, 52, 54, 56, 58, 60, i.e. regardless of whether the ribs 50, 52, 54, 56, 58, 60 are of the J-, K-, or L-type.

More particularly, the elongation of the belt 42 can be limited by increasing the number of load carrying cords 64 in the lateral dimension of the belt and by making the load carrying cords 64 from an inextensible material. As an example, when a J-type, V-ribbed belt having a rib pitch of 2.34 mm is used, the stress required on the belt to effect 1% elongation is calculated to be 2.34×17=40 kgf/rib (240 kgf/6 ribs) or greater. In the case of a K-type, V-ribbed belt having a rib pitch of 3.56 mm, a stress of 3.56×17=60 kgf/rib (360 kfg/6 ribs) or greater is required to effect a 1% elongation of the belt. In the case of an L-type, V-ribbed belt with a rib pitch of 4.70 mm, the stress required to elongate the belt is at least 4.70×17 =80 kgf/rib (480 kfg/6 ribs).

For purposes of comparison to the prior art, for the K-type belt, the tensile force for the inventive belt (60 kgf/rib) is more than three times the tensile force required to elongate a conventional belt to the same extent, i.e. 20 kgf/rib. Thus, elongation of the inventive belt is significantly reduced over the prior art belts.

For the same reason, the amount of contraction of the belt at the tensioned side thereof is reduced, thus suppressing noise generation resulting from belt slippage on the crank pulley even when the angular acceleration of the engine is decreased during the intake and compression strokes.

Any belt which elongates by 1% with a stress less than 17 kgf per 1 mm belt width is not desirable because such a belt has a significant amount of expansion and contraction during use which tends to generate a significant amount of noise.

As noted above, the nature of the load carrying cords 64 is critical in limiting the belt elongation. In a preferred form, the load carrying cords 64 are made at least partially from one of aramid fibers or glass fibers. Aramid fibers are preferred in an automobile engine compartment because the glass fibers do not have as good a resistance to water which is normally encountered in the engine compartment.

Further according to the invention, the load carrying cords 64 are preferably spun at a pitch between 1.05 and 1.25 times the diameter of the load carrying cords 64.

The amount of tension applied to the belt 42 by the auto-tensioner 30 through the idler pulley 40 during startup of the engine is preferably 0.85 to 2.0 kgf per 1 mm belt width. In the case of a J-type belt, the tension ranges between 2.0 and 4.6 kgf/rib. In the case of a K-type belt, the tension ranges between 3.0 and 7.0 kgf/rib. In the case of an L-type belt, the tension varies between 4.0 and 9.2 kgf/rib. These tension levels fall in the ordinary range of tension normally applied to such belts.

When the level of tension applied by the auto-tensioner 30 to the belt 42 is less than 0.85 kgf per 1 mm belt width, the belt slips which causes noise generation and wear. On the other hand, belt tension of greater than 2.0 kgf per 1 mm belt width is not preferred because such a high level of tension may cause damage to the system shafts and bearings and/or excessive loading on the belt 42.

According to the invention, the damping ratio of the auto-tensioner 30 is not greater than 20% and more preferably in the range of 10–20%. The damping ratio is equal to $2\times[(A-B)/(A+B)]\times100$, where A and B respectively indicate forces exerted during up-stroking and down-stroking of the idler pulley 40.

The damping ratio of 10–20% contemplated by the invention can be achieved through the friction developed between the pivot post 38 and the arm 32. Thus there is no need to provide a structure on the tensioner 30 dedicated to the damping function. The auto-tensioner 30 is thus required only to produce a consistent force on the belt 42. The inventive belt 42, used in combination with the auto-tensioner 30, exhibits elongation which is on the order of ⅓ of that exhibited by ordinary V-ribbed belts and thus noise generation is reduced compared to the more highly elongated prior art belts. Accordingly, the auto-tensioner can be simplified and, as a consequence of that, it is more durable and reliable.

TEST RESULTS

Inventive Test Belt No. 1

Testing was conducted to verify the improved operation attributable to the present invention. A system such as that shown in FIG. 1 herein was used on a spark-ignited four-cylinder internal combustion engine having a displacement of 2,000 cc. The belt 42 used was a K-type, 6-rib belt having a rib pitch of 3.56 mm. The load carrying cord was formed from aramid fibers (trade name KEVLAR). Three yarns of 1,000 denier were combined to form a 3,000 denier strand to obtain a load carrying cord of 0.81 mm diameter. The cord was then spun at a spinning pitch of 0.90 mm. The level of stress produced in the V-ribbed belt in response to 1% elongation was 73 kgf/rib (438 kgf/6 ribs) (73/3.56=20.5 kfg per 1 mm belt width).

Inventive Test Belt No. 2

Six yarns of 1,000 denier were combined to form a strand of 6,000 denier to produce a load carrying cord 64 of 1.02 mm diameter which was then spun at a pitch of 1.13 mm. The level of stress generated in this V-ribbed belt in response to 1% elongation was 122 kgf/rib (732 kgf/6 ribs) (122/3.56=34.3 kgf per 1 mm belt width).

Conventional Test Belts Nos. 1 and 2

The comparison belt samples were used on the same system setup as shown in FIG. 1. The belts had the same overall geometry as the inventive test belts. However, the load carrying cords were formed from polyester fibers. More specifically, the load carrying cords were made by accumulating five yarns of polyester fiber of 1,100 denier each into a strand of 5,500 denier, thus producing a load carrying cord having a 0.90 mm diameter. The load carrying cord was then spun at a spinning pitch of 1.03 mm. The belt had a stress level of about 20 kgf/rib (120 kgf/6 rib) (20/3.56=5.6 kgf per 1 mm belt width) in response to 1% elongation.

The level of tension applied by the auto-tensioner 30 to the belt ranged between 3 and 5 kgf/rib with a damping ratio of 15-18% for each of the inventive test belts.

For the conventional test belts, the tension levels ranged between 3 and 7 kgf/rib and the damping ratios ranged between 16 and 92%.

Figure 3A:
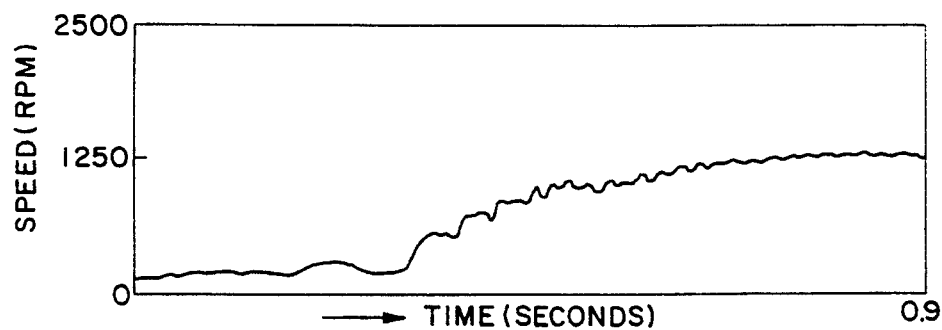
FIGS. 3A-3C are graphs showing speed, belt tension at the tensioned side of a belt, and tension displacement over time for a belt in a system according to the present invention.
Figure 3B:
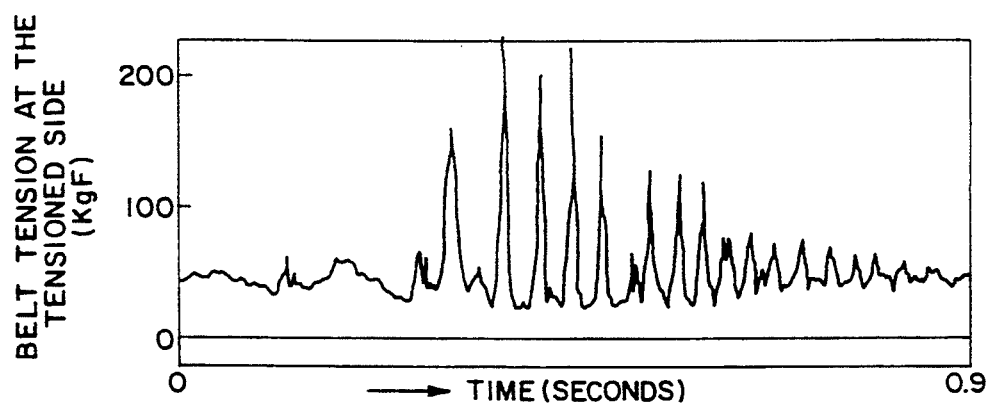
Figure 3C:
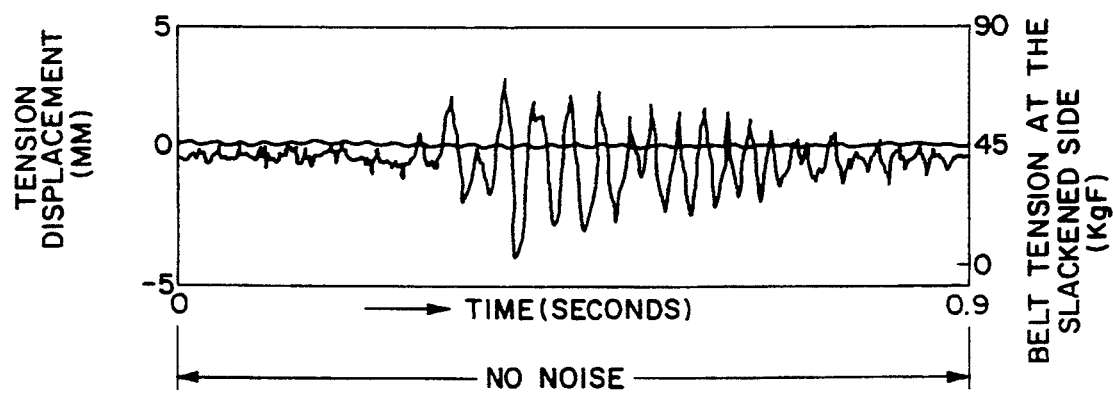
Figure 4A:
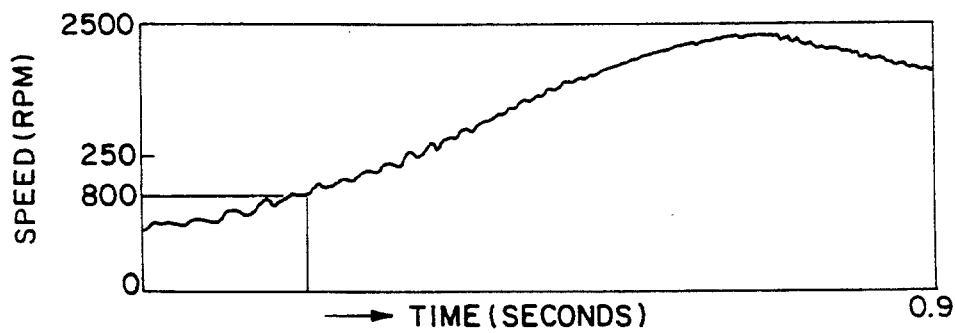
FIGS. 4A-4C are graphs showing speed, belt tension at the tensioned side of a belt, and tension displacement over time for a belt in a prior art system.
Figure 4B:
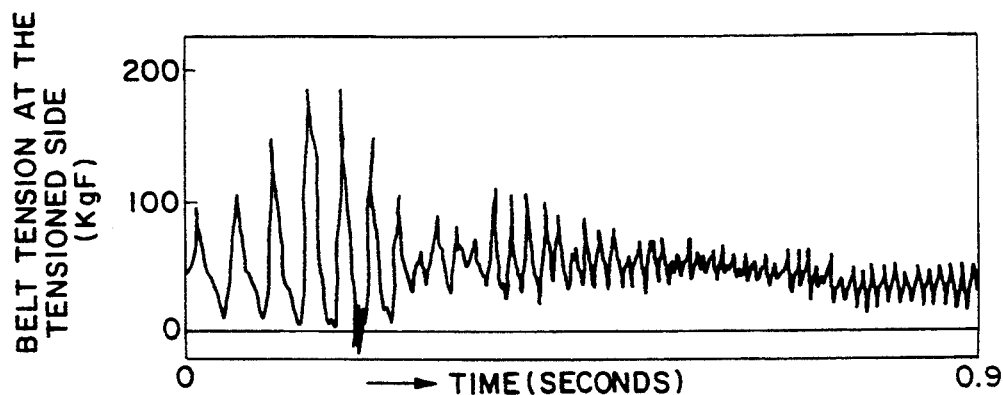
Figure 4C:
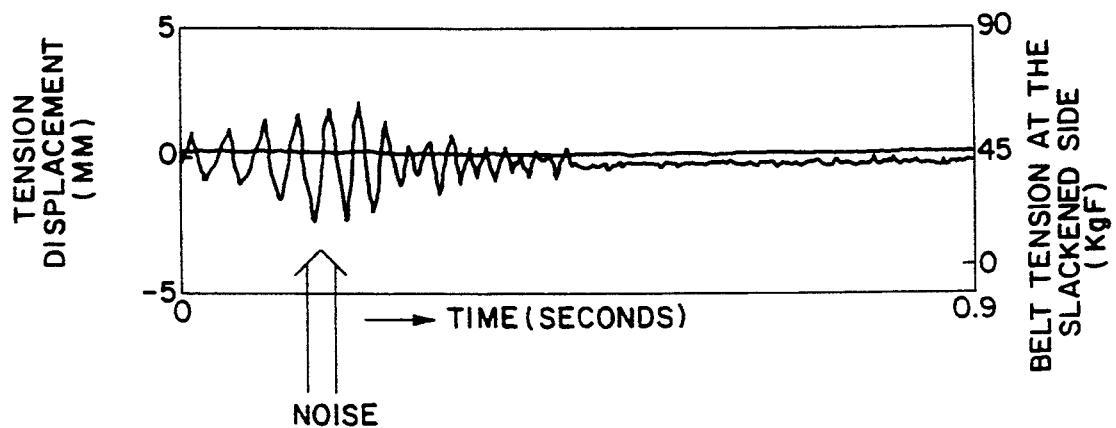

The results of the test are set out in the following Table 1.

noise generation were measured in relation to time, with the results being shown for the inventive test belt in FIG. 3 and for the conventional test belt in FIG. 4.

It can be seen that noise was not generated with the inventive test belt regardless of the speed of the engine. On the other hand, a high level of noise was generated when the engine with the conventional test belt reached a speed of about 800 rpm.

For reference purposes, a K-type, V-ribbed belt requiring a force of 60 kgf/rib for 1% elongation was tested without an auto-tensioner. Noise generation was greater than with a conventional, more extensible V-ribbed belt. This result is explainable as follows.

A belt having a high tension-to-strain ratio on one hand exhibits a small elongation in response to a change in the angular velocity, but, on the other hand, experiences a drastic reduction in tension even in response to slight elongation. Therefore, with such a belt the reduction of tension occurring at the slackened side due to change in angular velocity is greater than that in conventional V-ribbed belts, causing more generation of noise than the conventional belt.

The foregoing disclosure of specific embodiments is intended to be illustrative of the broad concepts comprehended by the invention.

We claim:

1. A power transmission system comprising:

a power transmission belt having a length and width and laterally oppositely facing pulley engaging side drive surfaces and a tensile strength such that a force of at least 17 kgf per 1 mm width is required to effect a 1% elongation of the power transmission belt;

a plurality of pulleys with which the power transmission belt is operatively engaged, said pulleys having facing surfaces to engage and drive/be driven by the pulley engaging side drive

TABLE 1

| | K-TYPE V-RIBBED BELT (6 RIB) | | | | | | |
|---|---|---|---|---|---|---|---|
| | | | | | TENSILE FORCE FOR | AUTO-TENSIONER | |
| | MATERIAL OF LOAD CARRYING CORD | SIZE OF LOAD CARRYING CORD | DIAMETER OF LOAD CARRYING CORD | SPINNING PITCH (mm) | 1% ELONGATION PER 1 mm BELT WIDTH (Kgf) | DAMPING RATIO (%) | LEVEL OF TENSION (Kgf/rib) | NOISE YES OR NO |
| CONVENTIONAL TEST BELT NO. 1 | POLYESTER | 5,500 | 0.90 | 1.03 | 5.6 | 92 | 3~7 | YES |
| CONVENTIONAL TEST BELT NO. 2 | | | | | | 16 | 5 | STRONGLY YES |
| INVENTIVE TEST BELT NO. 1 | ARAMID | 3,000 | 0.81 | 0.90 | 20.5 | 15 | 5 | NO |
| | | | | | | 18 | 3 | NO |
| INVENTIVE TEST BELT NO. 2 | ARAMID | 6,000 | 1.02 | 1.13 | 34.3 | 15 | 5 | NO |
| | | | | | | 18 | 3 | NO |

As can be seen from the results in Table 1, no substantial noise was generated when the V-ribbed belt was of a type with little elongation, even though the auto-tensioner had a small damping ratio, i.e. even when the vibration damping effect was insignificant.

In contrast, noise could not be eliminated in conventional test belt No. 1 even after significantly increasing the damping ratio of the auto-tensioner and adjusting the tension level. In conventional test belt No. 2, the level of noise was raised even further when the damping ratio was reduced.

Further test data was accumulated comparing conventional test belt No. 1 to inventive test belt No. 1. The levels of tension at the tensioned and slackened belt sides, tension displacement at the slackened side, and surfaces; and an auto-tensioner having an element to engage the power transmission belt, said auto-tensioner having a damping ratio that is not greater than 20% where the damping ratio is defined by the following formula:

damping ratio = $2[(A-B)(A+B)] \times 100$ where: A is the force exerted by the auto-tensioner element during upstroking of the auto-tensioner element and B is the force exerted by the auto-tensioner element during down-stroking of the auto-tensioner element.

2. The power transmission system according to claim 1 wherein the power transmission belt is a V-ribbed belt with a plurality of laterally spaced ribs and at least one of the pulleys has grooves to cooperate with the belt ribs.

3. The power transmission system according to claim 1 wherein the auto-tensioner element comprises an idler pulley.

4. The power transmission system according to claim 1 wherein the damping ratio is between 10 and 20%.

5. The power transmission system according to claim 1 wherein the auto-tensioner element exerts a force on the belt that is no greater than 2.0 kgf/1 mm belt width.

6. The power transmission system according to claim 1 wherein the power transmission belt has an unsupported tensioned portion between a first pair of pulleys and an unsupported slackened portion between a second pair of pulleys and the auto-tensioner element engages the unsupported slackened portion of the power transmission belt.

7. The power transmission system according to claim 1 wherein the auto-tensioner is attached to a frame, an arm is mounted for pivoting movement relative to the base in first and second opposite directions, and an idler pulley is carried by the auto-tensioner for engagement with the power transmission belt.

8. The power transmission system according to claim 2 wherein the power transmission belt is one of a) a J-type, b) K-type, and c) L-type V-ribbed belt.

9. The power transmission system according to claim 1 wherein the auto-tensioner does not have any structure dedicated to vibration damping.

10. The power transmission system according to claim 1 wherein the power transmission belt has longitudinally extending load carrying cords made at least partially from at least one of aramid and glass fibers.

11. The power transmission system according to claim 1 wherein the auto-tensioner has means for urging the auto-tensioner element against the belt with a force that is greater than 0.85 kgf/1 mm belt width.

12. The power transmission system according to claim 1 wherein there is a pivot post that mounts the auto-tensioner arm for pivoting movement relative to the base and the damping ratio is attributable substantially entirely to friction forces generated between the pivot post and base.

13. The power transmission system according to claim 10 wherein the load carrying cords are spun at a pitch that is between 1.05 and 1.25 times the diameter of the load carrying cords.

14. A power transmission system comprising:

A v-ribbed power transmission belt having a plurality of laterally spaced ribs; and an auto-tensioner having an element to engage the power transmission belt in an operative position trained around a plurality of pulleys, said auto-tensioner having a damping ratio that is not greater than 20% where the damping ratio is defined by the following formula:

damping ratio = $2[(A-B)/(A+B)] \times 100$ where: A is the force exerted by the auto-tensioner element during up-stroking of the auto-tensioner element and B is the force exerted by the auto-tensioner element during down-stroking of the auto-tensioner element.

15. The power transmission system according to claim 14 wherein the auto-tensioner does not have any structure dedicated to vibration damping.

16. The power transmission system according to claim 14 wherein the power transmission belt has longitudinally extending load carrying cords made at least partially from at least one of aramid and glass fibers.

17. The power transmission system according to claim 14 wherein the damping ratio is between 10 and 20%.

18. The power transmission system according to claim 14 wherein the auto-tensioner has means for urging the auto-tensioner element against the power transmission belt with a force between 0.85 and 2.0 kfg/1 mm belt width with the power transmission belt in operative position trained around at least a pair of spaced cooperating pulleys.

19. The power transmission system according to claim 14 wherein the power transmission belt is one of a) a J-type, b) K-type, and c) L-type V-ribbed belt.

20. The power transmission system according to claim 14 wherein there is a pivot post that mounts the auto-tensioner arm for pivoting movement relative to a base and the damping ratio is attributable substantially entirely to friction forces generated between the pivot post and base.

21. The power transmission system according to claim 14 in combination with first and second pulleys which are operatively engaged with the power transmission belt.

22. The power transmission system according to claim 16 wherein the load carrying cords are spun at a pitch that is between 1.05 and 1.25 times the diameter of the load carrying cords.

* * * * *